United States Patent
Hedges et al.

(10) Patent No.: US 12,128,879 B2
(45) Date of Patent: Oct. 29, 2024

(54) VEHICLE LOCALIZATION BASED ON POSE CORRECTIONS FROM REMOTE CAMERAS

(71) Applicant: Aptiv Technologies AG, Schaffhausen (CH)

(72) Inventors: Christopher A. Hedges, Greentown, IN (US); Jeremy S. Greene, Indianapolis, IN (US)

(73) Assignee: Aptiv Technologies AG, Schaffhausen (CH)

( * ) Notice: Subject to any disclaimer, the term of this patent is extended or adjusted under 35 U.S.C. 154(b) by 62 days.

(21) Appl. No.: 17/818,471

(22) Filed: Aug. 9, 2022

(65) Prior Publication Data

US 2024/0051519 A1 Feb. 15, 2024

(51) Int. Cl.
*B60W 30/06* (2006.01)
*G06T 7/73* (2017.01)
(Continued)

(52) U.S. Cl.
CPC ............... *B60W 30/06* (2013.01); *G06T 7/73* (2017.01); *G06V 20/54* (2022.01); *H04W 4/40* (2018.02);
(Continued)

(58) Field of Classification Search
CPC ............. B60W 30/06; B60W 2556/40; B60W 2556/45; G06T 7/73; G06T 2207/30204;
(Continued)

(56) References Cited

U.S. PATENT DOCUMENTS

| | | | |
|---|---|---|---|
| 2015/0039173 A1* | 2/2015 | Beaurepaire | B60W 30/06 701/23 |
| 2015/0138001 A1* | 5/2015 | Davies | G08G 1/146 340/932.2 |

(Continued)

FOREIGN PATENT DOCUMENTS

JP 2020051116 A 4/2020

OTHER PUBLICATIONS

Extended European Search Report regarding Application No. 23175160.3, mailed Feb. 1, 2024.

*Primary Examiner* — Thomas D Alunkal
(74) *Attorney, Agent, or Firm* — Harness, Dickey & Pierce, P.L.C.

(57) ABSTRACT

This document describes techniques and systems for vehicle localization based on pose corrections from remote cameras in parking garages and other GNSS denial environments. A system can include a processor and computer-readable storage media comprising instructions that, when executed by the processor, cause the system to determine an estimated pose of the host vehicle within a GNSS denial environment after the host vehicle has been parked at a drop-off area. The system can also receive a corrected pose of the host vehicle from one or more remote cameras in the GNSS denial environment. The instructions further cause the processor to use the corrected pose to determine an updated pose for the host vehicle. In this way, the system can provide highly accurate vehicle localization in GNSS denial environments in a cost-effective manner to support automated valet parking and other autonomous driving functionalities.

18 Claims, 9 Drawing Sheets

(51) Int. Cl.
*G06V 20/54* (2022.01)
*H04W 4/40* (2018.01)

(52) U.S. Cl.
CPC ..... *B60W 2556/40* (2020.02); *B60W 2556/45* (2020.02); *G06T 2207/30204* (2013.01); *G06T 2207/30252* (2013.01); *G06V 2201/08* (2022.01)

(58) Field of Classification Search
CPC .......... G06T 2207/30252; H04W 4/40; G06V 20/54; G06V 2201/08
See application file for complete search history.

(56) References Cited

U.S. PATENT DOCUMENTS

| | | | | |
|---|---|---|---|---|
| 2016/0362103 | A1* | 12/2016 | Büschenfeld | G08G 1/005 |
| 2020/0207333 | A1* | 7/2020 | Miller | G01C 21/3602 |
| 2021/0142671 | A1* | 5/2021 | Takato | G08G 1/065 |
| 2021/0331666 | A1* | 10/2021 | Meng | G08G 1/146 |

* cited by examiner

VEHICLE LOCALIZATION BASED ON POSE CORRECTIONS FROM REMOTE CAMERAS

BACKGROUND

Vehicle localization is a technique of using sensor data to localize a vehicle to a map (e.g., determining the location of the vehicle on a reference map). Vehicle localization may be used to support autonomous vehicle operations, such as automated valet parking. Automated valet parking can involve a vehicle arriving at a drop-off area (e.g., a designated parking spot), the driver exiting the vehicle, the vehicle autonomously driving to a parking area, and, later, the driver remotely summoning the vehicle to a pickup area (e.g., a designated loading spot). To perform the autonomous driving required to park and summon the vehicle, automated valet parking systems require accurate vehicle localization.

Some autonomous vehicles perform driving operations, which depend on a localization accuracy that is near the sub-meter accuracy level. The sub-meter accuracy level may be achieved with navigation systems, including global navigation satellite systems (GNSS) receivers. However, GNSS systems generally cannot receive positioning data when the vehicle is within a GNSS denial environment, such as an indoor parking structure or garage, and thus the vehicle cannot perform automated valet parking.

SUMMARY

This document describes techniques and systems for vehicle localization based on pose corrections from remote cameras in parking garages and other GNSS denial environments. In some examples, a system includes at least one processor and at least one computer-readable storage medium comprising instructions that, when executed by the processor, cause the system to determine an estimated pose of the host vehicle within a GNSS denial environment after the host vehicle has been parked at a drop-off area in the GNSS denial environment. The system can also receive a corrected pose of the host vehicle from one or more remote cameras in the GNSS denial environment. The instructions further cause the processor to use the corrected pose to determine an updated pose for the host vehicle. In this way, the system can provide highly accurate vehicle localization in GNSS denial environments in a cost-effective manner to support automated valet parking and other autonomous driving functionalities.

This document also describes methods performed by the above-summarized system and other configurations of the system set forth herein and means for performing these methods.

This Summary introduces simplified concepts related to vehicle localization based on pose corrections from remote cameras in parking garages, which are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques enabling vehicle localization based on pose corrections from remote cameras in parking garages are described with reference to the following drawings. The same numbers are used throughout the drawings to reference like features and components:

FIGS. 2-1 and 2-2 provide example illustrations of other environments in which vehicle localization based on pose corrections from remote cameras in parking garages may be implemented, in accordance with techniques of this disclosure;

DETAILED DESCRIPTION

Overview

As described above, vehicle localization can support autonomous vehicle operations (e.g., automated valet parking). Autonomous vehicle operations can depend on a localization accuracy that is near the sub-meter accuracy level. The sub-meter accuracy level may be achieved with navigation systems, including global navigation satellite systems (GNSS) receivers. However, GNSS systems generally cannot receive positioning data when the vehicle is within a GNSS denial environment, such as an indoor parking structure or garage, and thus autonomous vehicle operations may not be available in such environments.

For GNSS denial environments, some systems may use Simultaneous Localization and Mapping (SLAM) techniques that map out features as a vehicle traverses through an unknown environment. These SLAM systems can then use the mapped-out features to localize the vehicle. Such systems generally rely on vision, LiDAR, or radar systems and complex feature-extraction algorithms to localize the host vehicle to environment features (e.g., parking garage walls).

Other systems may use an absolute map for the GNSS denial environment. The absolute map anchors the environment to a global coordinate system and allows the host vehicle to smoothly handle a transition between open skies and indoor environments. Such systems, however, rely on an expensive inertial measurement unit (IMU) system that uses vehicle odometry to maintain the vehicle positioning inside the GNSS denial environment. In addition, such absolute maps for GNSS denial environments are not available for many GNSS denial environments.

This document describes methods and systems for vehicle localization based on pose corrections from remote cameras in parking garages and other GNSS denial environments.

The host vehicle can initially determine an estimated pose of the host vehicle within the parking garage after the host vehicle has been parked at a drop-off area. The host vehicle can also receive a corrected pose of the host vehicle from the remote camera and determine an updated pose. The host vehicle can then use the updated pose to autonomously operate the host vehicle in the parking garage. In this way, a highly accurate vehicle pose may be obtained in a cost-effective manner without expensive onboard sensors to support automated valet parking and other autonomous vehicle operations in parking structures and other GNSS denial environments.

Example Environment

Figure 1:
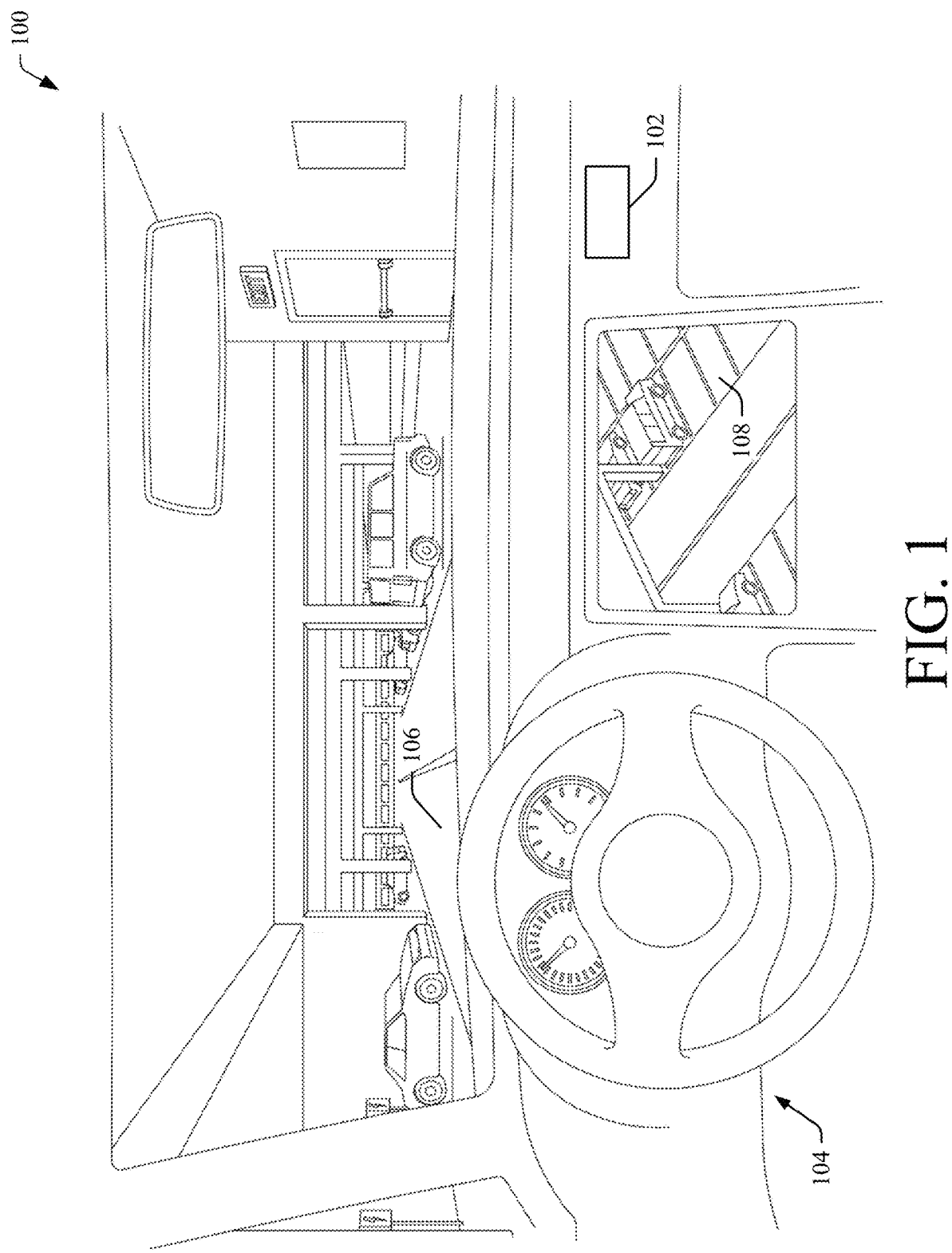
FIG. 1 is an example illustration of an environment in which vehicle localization based on pose corrections from remote cameras in parking garages may be implemented, in accordance with techniques of this disclosure.

FIG. 1 is an example illustration of an environment 100 in which vehicle localization based on pose corrections from remote cameras in parking garages may be implemented. In particular, a host vehicle 104 may navigate the environment 100 using pose corrections from one or more remote cameras. In the example environment 100, a system 102 is located in the host vehicle 104. The host vehicle 104 is autonomously traveling or about to autonomously operate along a roadway 106 in a parking garage or other GNSS denial environment. In the depicted implementation, the host vehicle 104 is navigating to a parking space 108 using an automated parking valet feature.

The system 102 can use one or more sensors (not shown) of the host vehicle 104 to determine an estimated pose (or location) of the host vehicle 104 within the environment 100. As described in greater detail below, the one or more sensors do not include a GNSS or GPS system because the environment 100 is a GNSS denial environment. The system 102 utilizes one or more communication systems (not shown) to send a pose request to remote cameras, which can include a camera integrated into a smartphone of a driver of the host vehicle 104 or an infrastructure camera installed in the environment 100. The system 102 can also send the estimated pose to the remote camera. In response to the pose request, the system 102 can receive a corrected pose of the host vehicle 104 from the remote camera. The system 102 can then use the corrected pose to determine an updated pose of the host vehicle 104. In this way, a highly accurate vehicle pose may be obtained in a cost-effective manner without expensive onboard sensors to perform an automated parking valet operation or other autonomous driving functions.

The updated pose may be used by the system 102 to autonomously navigate or begin navigation of the environment 100 based on a reference map generated by the system 102 or a remote system (not shown) for the environment 100. The updated pose may further be used in conjunction with an existing reference map to localize the host vehicle 104.

Figures 1, 2:
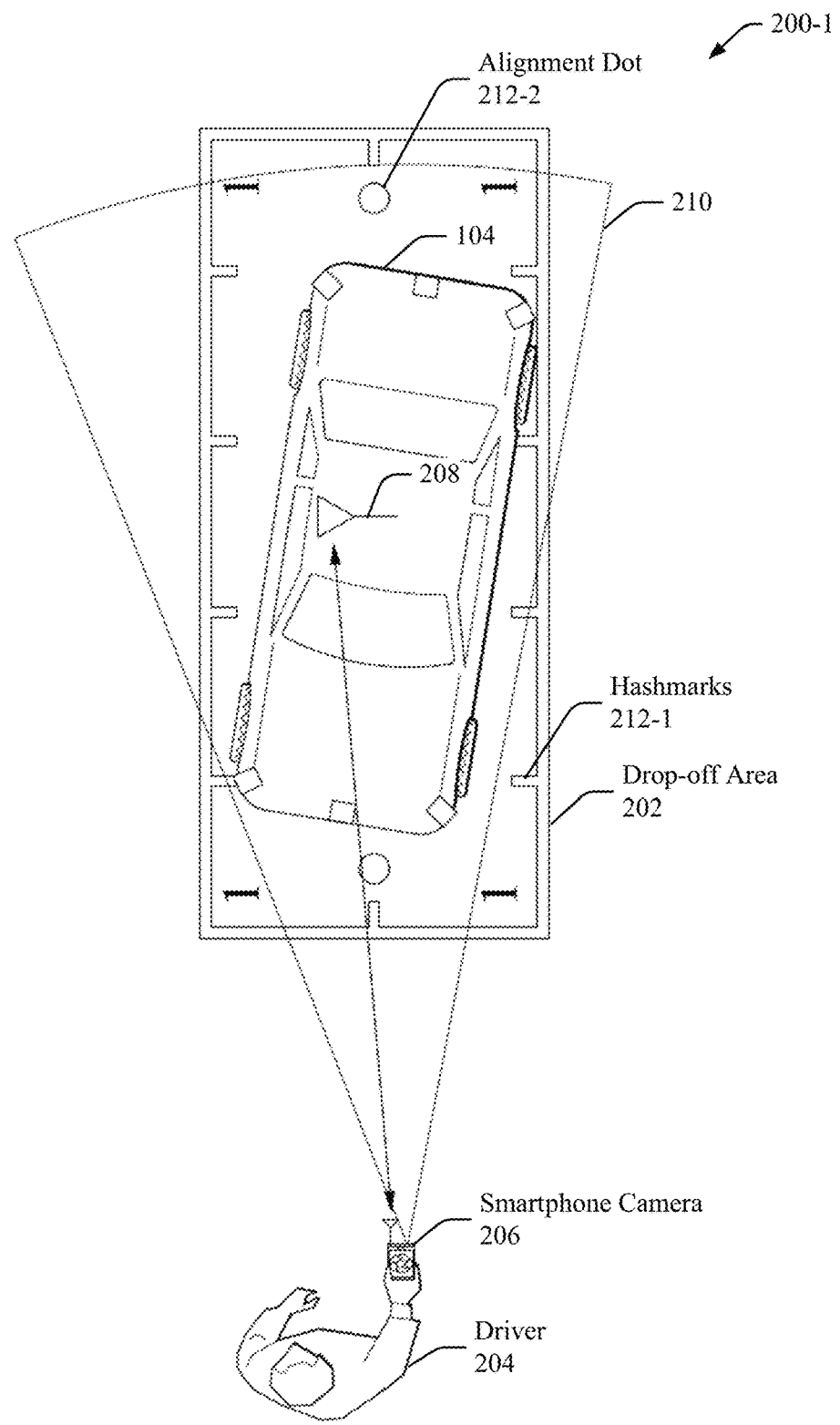
Figure 2:
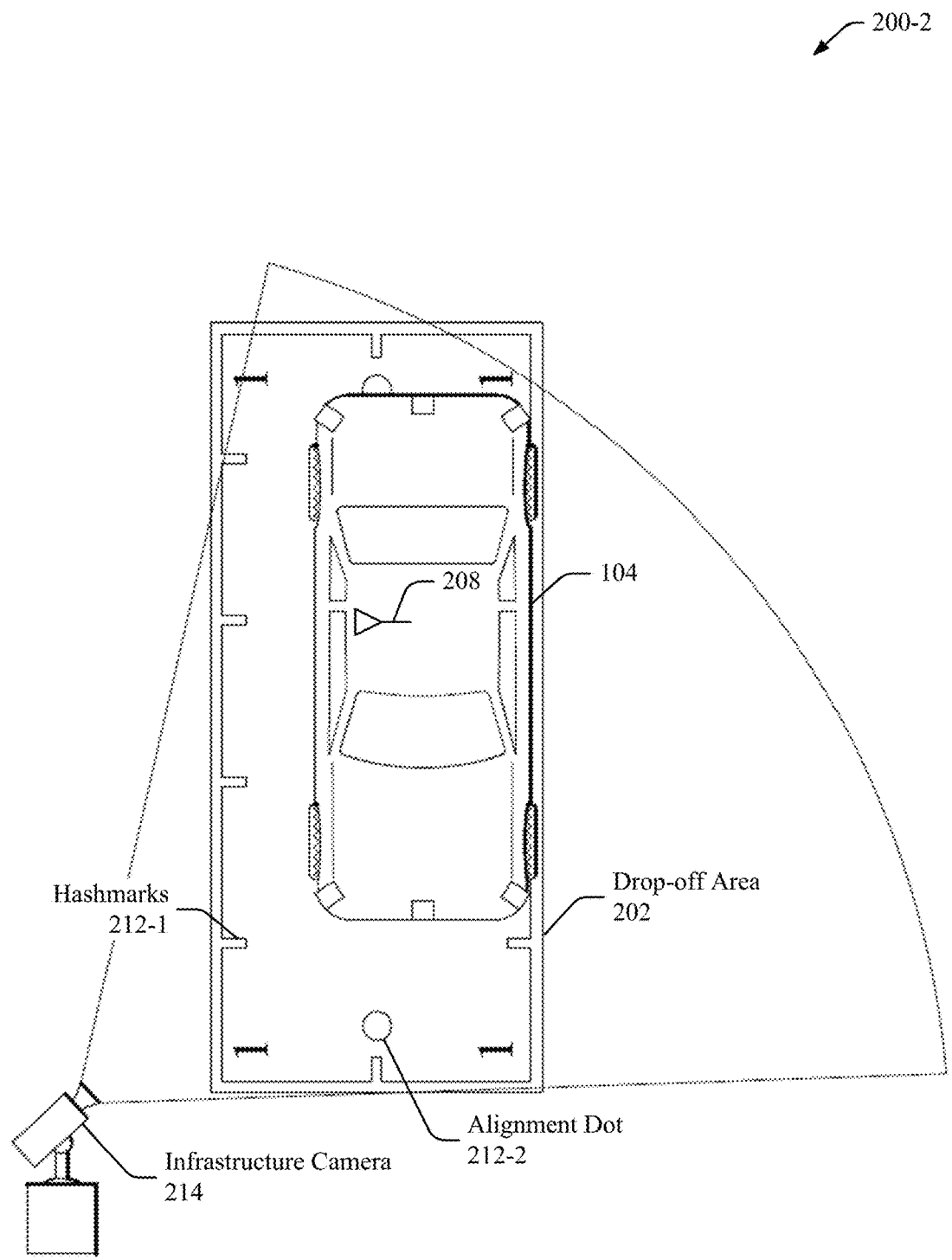

FIGS. 2-1 and 2-2 provide example illustrations of other environments 200-1 and 200-2, respectively, in which vehicle localization based on pose corrections from remote cameras in parking garages may be implemented. In particular, the host vehicle 104 may park or be parked in a drop-off area 202 in the environment 200-1 or 200-2. The drop-off area 202 can include various features, such as one or more hashmarks 212-1 and alignment dots 212-2. The drop-off area 202 can be a designated parking spot or other area within a GNSS denial environment at which a driver 204 can park and initiate an automated parking valet feature of the host vehicle 104.

The host vehicle 104 can localize itself within the GNSS denial environment using pose corrections from a remote camera, including a smartphone camera 206 (e.g., integrated in a smartphone of the driver 204, as illustrated in FIG. 2-1) or an infrastructure camera 214 (e.g., as illustrated in FIG. 2-2). In the example environments 200-1 or 200-2, the host vehicle 104 uses the system 102, which is described in greater detail with respect to FIGS. 3 and 4, to localize itself within the GNSS denial environment (e.g., a parking structure).

The system 102 can use pose corrections provided by the smartphone camera 206 to localize the host vehicle 104 in the environment 200-1. For example, upon parking in the drop-off area 202, the driver 204 can exit the host vehicle 104 and use their smartphone camera 206 to take a picture 210 (or video) of the host vehicle 104 and the drop-off area 202. The smartphone can then provide the picture to the host vehicle 104 via a communications device 208. In other implementations, the smartphone can provide the picture to a remote computing system (e.g., located in the cloud). The system 102 or the remote computing system can then process the picture and determine a pose correction for the host vehicle 104. The pose correction can be determined by analyzing a position of one or more features of the host vehicle 104 (e.g., a bumper, tire, fender) relative to a position of one or more features of the drop-off area 202 (e.g., the hashmark 212-1 or the alignment dot 212-2). A similar operation can be performed by the infrastructure camera 214 to provide a corrected pose to the system 102.

Figure 3:
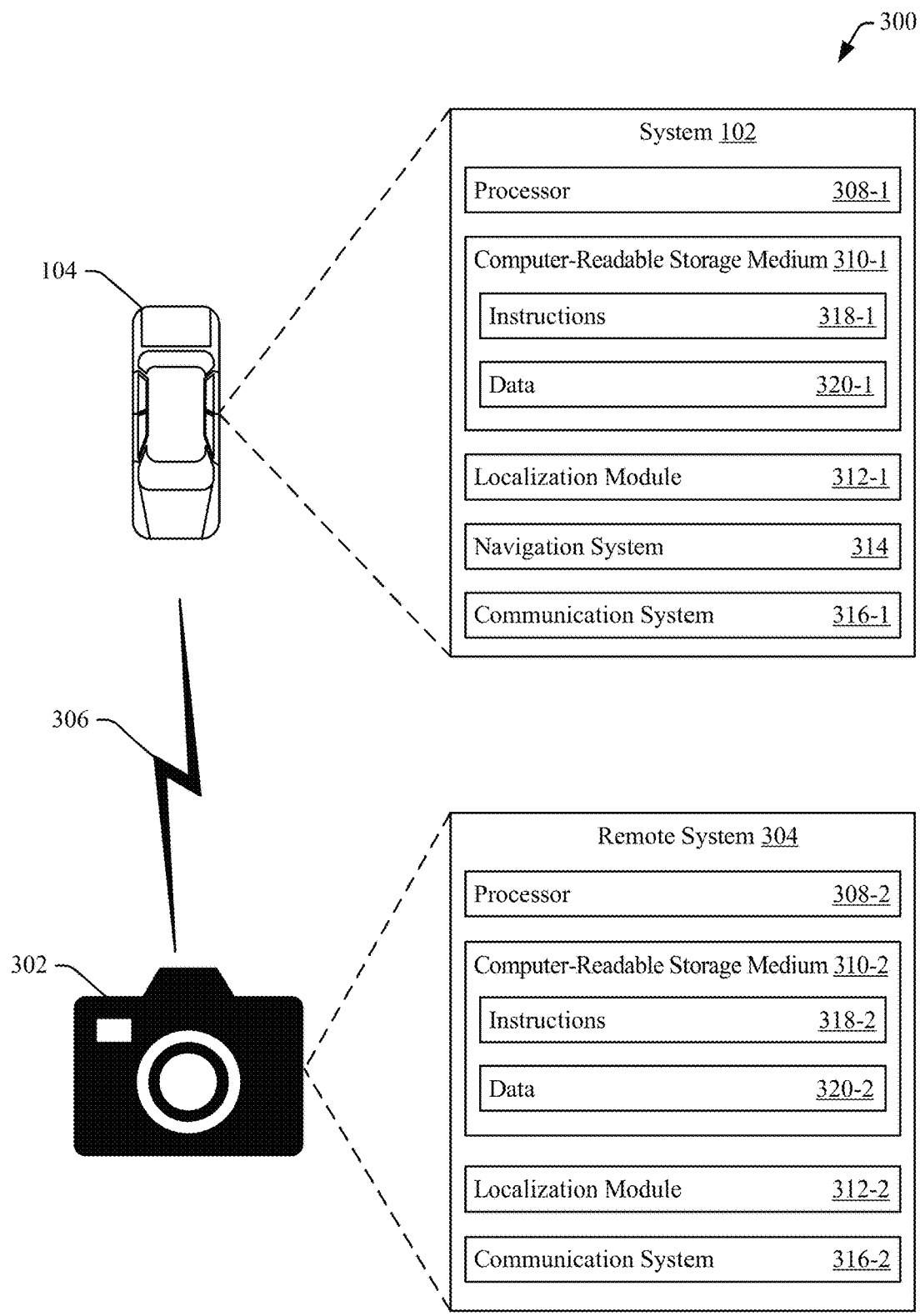
FIG. 3 is an example illustration of systems that may be used to implement vehicle localization based on pose corrections from remote cameras in parking garages, in accordance with techniques of this disclosure.

The system 102 can also use the communication device 208, which is described in greater detail with respect to FIG. 3, to establish a wireless link with the smartphone camera 206 or the infrastructure camera 214. The wireless link can be used to transmit a pose request to the smartphone camera 206 or the infrastructure camera 214 and, in response to the pose request, receive a pose correction. The system 102 can then use the pose correction to determine an updated pose for the host vehicle 104. In this way, the system 102 can determine an accurate and cost-effective pose to perform an automated valet parking function.

The system 102 is also used to determine an estimated pose of the host vehicle 104 within the environment 200. For example, the estimated pose can be determined based on sensor data providing the distance traveled and heading of the host vehicle 104 upon loss of the GNSS signal or from another location known in a world or map coordinate system. In some implementations, the picture of the host vehicle 104 in the drop-off area 202 can be processed in conjunction with the estimated pose from the system 102 to aid in the determination of the pose correction.

Example Systems

FIG. 3 is an example illustration 300 of systems that may be used to implement vehicle localization based on pose corrections from remote cameras in parking garages. The example illustration 300 comprises the system 102 of the host vehicle 104 and a remote system 304 of a remote camera 302. The remote camera 302 can, for example, be the smartphone camera 206 of FIG. 2-1 or the infrastructure camera 214 of FIG. 2-2. Although the host vehicle 104 is illustrated as a car, the host vehicle 104 may comprise any vehicle (e.g., a truck, a bus, a boat, a plane) without departing from the scope of this disclosure.

The system 102 and the remote system 304 may be connected via a wireless link 306. Although the remote system 304 is illustrated as part of the remote camera 302, the remote system 304 can be located in a separate, remote computer system (e.g., in the cloud) to process image or video data from the remote camera 302 and communicate the corrected pose to the system 102 via the wireless link 306 or another wireless link (not illustrated) in other embodiments.

As illustrated in FIG. 3, the system 102 and the remote system 304 each include at least one processor 308 (e.g., processor 308-1 and processor 308-2, respectively), at least one computer-readable storage medium 310 (e.g., computer-readable storage medium 310-1 and 310-2, respectively), localization modules 312 (e.g., localization module 312-1 and 312-2, respectively), and communication systems 316 (e.g., communication system 316-1 and 316-2, respectively).

The system 102 also includes one or more sensors (not illustrated) that may include cameras, radar systems, ultrasonic sensors, and/or lidar systems. The system 102 can use the sensors to provide data to the localization module 312-1 and/or a navigation system 314 of the host vehicle 104. For example, the localization module 312-1 can use sensor data to determine an estimated pose of the host vehicle 104. The localization module 312-1 may include a geospatial positioning system (e.g., a global positioning system (GPS), global navigation satellite system (GNSS or GLONASS) sensor), an inertial measurement system (e.g., a gyroscope or accelerometer), or other sensors (e.g., a magnetometer, software positioning engine, wheel tick sensor, lidar odometer, vision odometer, radar odometer, or other sensor odometers). The localization module 312-1 may provide high-accuracy location data (e.g., to within a meter) under ideal conditions or low-accuracy location data (e.g., to within a couple of meters) under non-ideal conditions (e.g., within a parking garage). For example, the localization module 312-1 can use dead reckoning to provide an estimated pose of the host vehicle 104 within a GNSS denial environment. The localization module 312-1 can determine the distance and direction traveled by the host vehicle 104 since entering the GNSS denial environment to determine an estimated pose within the GNSS denial environment (e.g., at the drop-off area 202 in a parking garage).

The navigation system 314 can use sensor data and the pose of the host vehicle 104 to navigate the GNSS denial environment to the desired location (e.g., a designated parking spot or a pick-up area). The navigation system 314 can use pose data from the localization module 312-1 and/or sensor data from the sensors to navigate the host vehicle 104 along roadways and within GNSS denial environments. For example, the navigation system 314 can navigate the host vehicle 104 from the drop-off area 202 to a designated parking spot for an automatic valet parking operation using the vehicle pose at the drop-off area 202 and a reference map of the GNSS denial environment.

The remote system 304 can use the localization module 312-2 to process images or videos of the host vehicle 104 and determine a pose of the host vehicle 104. For example, the remote system 302 can process an image captured by the remote camera 302 that includes the host vehicle 104 and the drop-off area 202. Based on the position of one or more portions of the host vehicle 104 to one or more hashmarks 212-1, alignment dots 212-2, or other features of the drop-off area 202, the localization module 312-2 can determine the pose of the host vehicle 104 in a map coordinate system.

The communication systems 316 facilitate the exchange of data, including a pose request, an estimated pose, a corrected pose, and/or other information (e.g., regarding the GNSS denial environment) over the wireless link 306. The communication systems 316 can, for example, include hardware, software, and/or firmware required to communicate via Wi-Fi, Dedicated Short-Range Communication, Vehicle-to-Everything (V2X), or cellular communication.

The processors 308 (e.g., application processors, microprocessors, digital signal processors (DSP), or controllers) are configured to execute computer-executable instructions 318 (e.g., instructions 318-1 and 318-2) stored within the computer-readable storage media 310 (e.g., non-transitory storage devices such as hard drives, solid state drives (SSD), flash memories, read-only memories (ROM), erasable programmable ROM (EPROM), or electrically erasable programmable ROM (EEPROM)) to cause the system 102 and remote system 304 to perform the techniques described herein. The instructions 318 may be part of operating systems and/or one or more applications of the system 102 and remote system 304.

The instructions 318 cause the system 102 and the remote system 304 to act upon (e.g., create, receive, modify, delete, transmit, or display) data 320 (e.g., 320-1 and 320-2). The data 320 may comprise application data, module data, sensor data, or input/output (I/O) data. The data 320 can also include a reference map for GNSS denial environments (e.g., parking garages) or the location of certain landmarks (e.g., a charging station, walls, columns, parking spots, the drop-off area 202) within GNSS denial environments. Although shown within the computer-readable storage media 310, portions of the data 320 may be within random-access memories (RAM) or caches of the system 102 and the remote system 304 (not shown). Furthermore, the instructions 318 and/or the data 320 may be remote to the system 102 and the remote system 304.

The localization module 312-1 and the navigation system 314 (or portions thereof) may be located within the computer-readable storage media 310-1 or be stand-alone components (e.g., executed in dedicated hardware in communication with the processor 308-1 and computer-readable storage medium 310-1). For example, the instructions 318-1 may cause the processor 308-1 to implement or otherwise cause the system 102 to implement the techniques described herein.

Vehicle Localization Process

Figure 4:
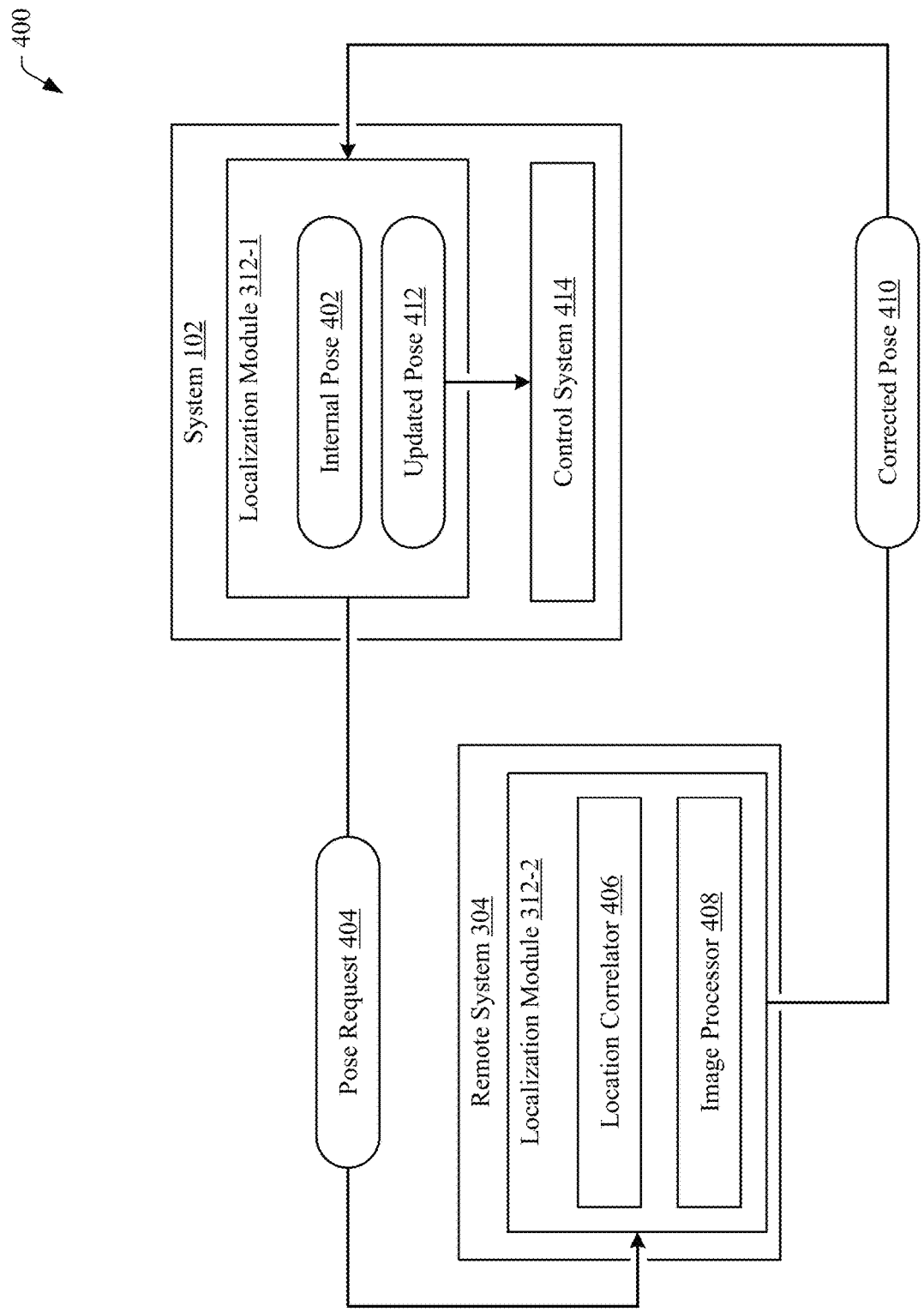
FIG. 4 is an example conceptual diagram of a process to localize a host vehicle based on pose corrections from a remote camera in a parking garage, in accordance with techniques of this disclosure.

FIG. 4 is an example conceptual diagram 400 of a process to localize a host vehicle (e.g., the host vehicle 104) based on pose corrections from a remote camera (e.g., the remote camera 302) in a parking garage. Conceptual diagram 400 may be performed by the system 102 of the host vehicle 104. Conceptual diagram 400 may include additional or fewer operations or be performed in a different order.

As the host vehicle 104 autonomously navigates a parking garage or other GNSS denial environment or once the host vehicle 104 is parked or parks at a drop-off area, the localization module 312-1 of the system 102 can estimate an internal pose 402 of the host vehicle 104. The internal pose 402 can be in a world coordinate system (or a map coordinate system). The localization module 312-1 can use sensors to determine the internal pose 402. For example, the localization module 312-1 can use odometry sensors and/or inertial measurement units to determine the distance and heading traveled by the host vehicle 104 upon entry into the parking garage. Such odometry sensors and inertial measurement units, however, are subject to drift and the internal pose 402 may not be sufficiently accurate for autonomous navigation in the parking garage.

To improve the accuracy of the internal pose 402, the system 102 and/or the localization module 312-1 can transmit a pose request 404 to the remote system 304 of the remote camera 302 (or a remote computing system communicatively coupled to the remote camera 302). The pose request 404 includes a query for the remote system 304 to provide the position of the host vehicle 104 as determined by the localization module 312-2 of the remote system 304. The system 102 and/or the localization module 312-1 can also transmit the internal pose 402 along with or separate from the pose request 404.

The localization module 312-2 can use image or video data from the remote camera 302 to determine a corrected pose 410 of the host vehicle 104. For example, the localization module 312-2 can use a location correlator 406 and an image processor 408. The image processor 408 can process the image or video data to identify the hashmarks 212-1 or the alignment dot 212-2 associated with the drop-off area 202. The location correlator 406 can use the data from the image processor 408 to determine the position of the host vehicle 104 relative to the drop-off area 202. In the described implementation, the remote system 304 can obtain the location of the drop-off area 202 in a world or map coordinate system from a database, QR code located in or near the drop-off area, or wireless communication with infrastructure in the parking garage. Using the relative pose of the host vehicle 104, the localization module 312-2 can determine the corrected pose 410 of the host vehicle 104. The remote system 304 and/or the localization module 312-2 can transmit the corrected pose 410 to the system 102 and/or the localization module 312-1 of the host vehicle 104.

The localization module 312-1 can use the corrected pose 410 to determine an updated pose 412 of the host vehicle 104. Similar to the internal pose 402, the updated pose 412 is in the map or world coordinate system. If the localization module 312-1 receives multiple corrected poses 410 from one or more remote cameras 302, the localization module 312-1 can average the corrected poses 410 to determine the updated pose 412. The localization module 312-1 and/or the system 102 then provides the updated pose 412 to a control system 414 of the host vehicle 104. The control system 414 uses the updated pose 412 to perform autonomous navigation of the host vehicle 104 within the parking garage, including for an automated valet parking operation.

Building a Radar Reference Map

Figure 5:
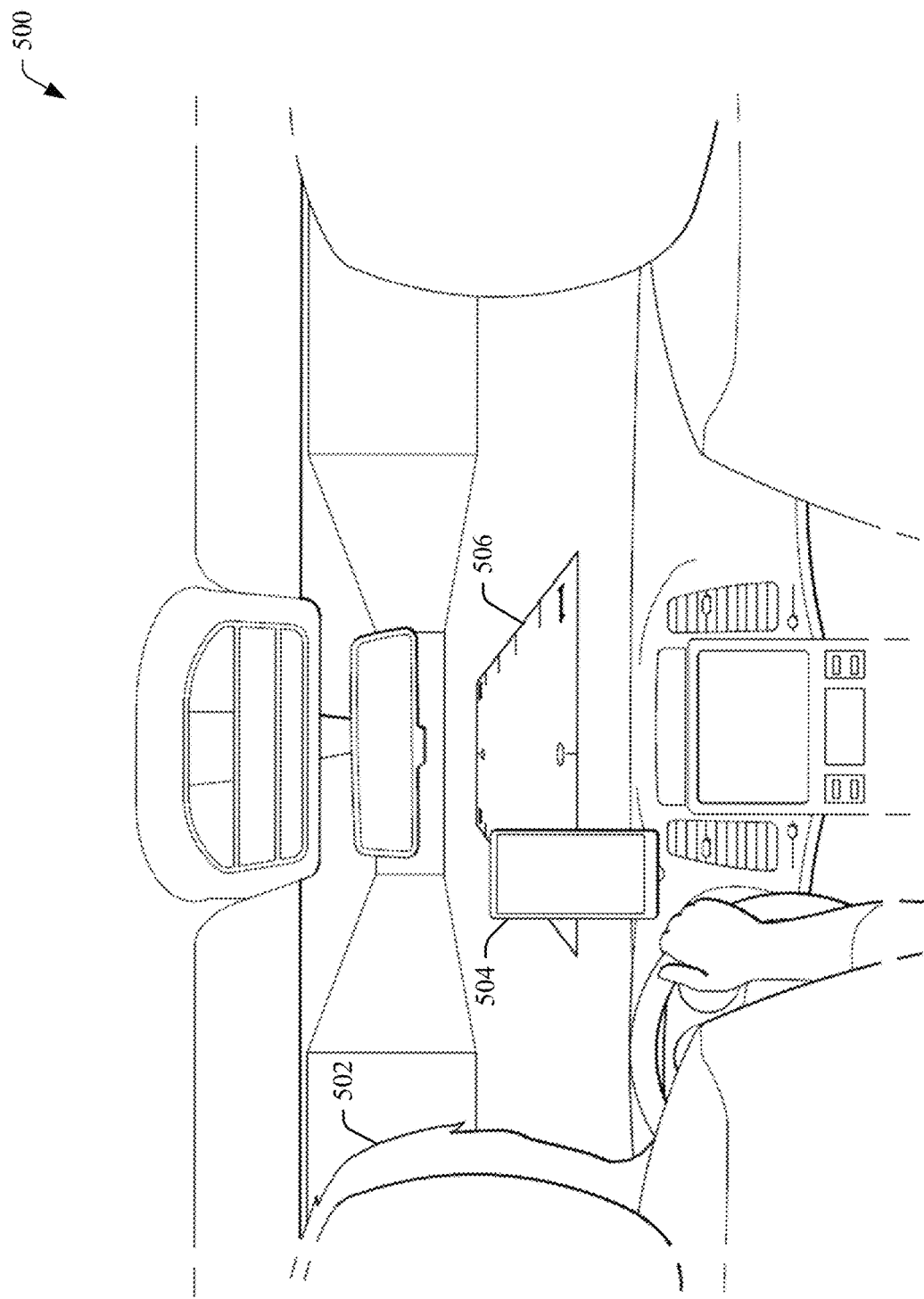
FIG. 5 is an example illustration of an environment in which a reference map for vehicle localization within a GNSS denial environment can be generated.

FIG. 5 is an example illustration of an environment 500 in which a reference map for vehicle localization within a GNSS denial environment can be generated. A host vehicle (e.g., the host vehicle 104) is manually driven by a driver 502 within the environment 500. A smartphone 504 is mounted within the host vehicle and configured to capture a video of the roadway within the GNSS denial environment to generate or refine a reference map for the environment 500. For example, the driver 502 can drive the host vehicle from a designated drop-off area to a designated parking spot 506. As the driver 502 navigates the environment 500 to the parking spot 506, the smartphone 504 captures a video of the GNSS denial environment.

The system 102 or a remote computer can use the video of the GNSS denial environment to generate or update an occupancy grid for the GNSS denial environment (e.g., a parking garage). The occupancy grid is a grid-based representation of the environment that provides a reference map in a world or map coordinate system that the system 102 can use to localize the host vehicle 104. For example, the occupancy grid may be a Bayesian, Dempster Shafer, or other type of occupancy grid. Each cell of the occupancy grid represents an independent portion of space, and each cell value of the occupancy grid represents a probability (e.g., 0-100%) that the corresponding portion of space is occupied. A probability of around 0% for a cell may indicate that the corresponding portion of space is free or not permanently occupied, while a probability closer to 100% may indicate that the corresponding portion of space is occupied (e.g., by a wall or column), and therefore, not free space. The occupancy grid may also be supplemented with information determined from the video or other sensor data (e.g., radar detections).

The system 102 can also determine landmarks from the video captured by the smartphone 504. The landmarks can be center coordinates of respective groups of cells of the occupancy grid with probabilities greater than a threshold. The landmarks comprise clusters, contours, or bounding boxes of the cells of the occupancy grid. The landmarks have weights based on one or more of probabilities, classifications, or cross-section values of the respective landmarks. The landmarks may be determined using binarization, a clustering algorithm, or machine learning on the occupancy grid. The determination of the landmarks generally applies a threshold value to the occupancy grid and removes any noise from the occupancy grid. In other implementations, the landmarks may already be determined or identified in the occupancy grid.

The system 102 can then generate a reference map from the landmarks and/or the occupancy grid. The reference map may be a statistical reference map (e.g., a Gaussian representation). The reference map can include a collection of Gaussians corresponding to occupied areas. The Gaussians (or the cells of the reference map) have associated location information (e.g., low or high-quality location information depending on how the reference map is generated). Each cell of the reference map can have a single Gaussian or be blank. Although not required, the reference map has cells that are larger than the cells of the occupancy grid. The reference map can be a stand-alone map or a layer in another map (e.g., a layer in a high-definition (HD) map). In this way, the system 102 can generate or update a reference map for the environment 500 to perform future vehicle localization and autonomous driving functions (e.g., automated valet parking) in the GNSS denial environment.

Methods to Perform Automated Valet Parking

Figure 6:
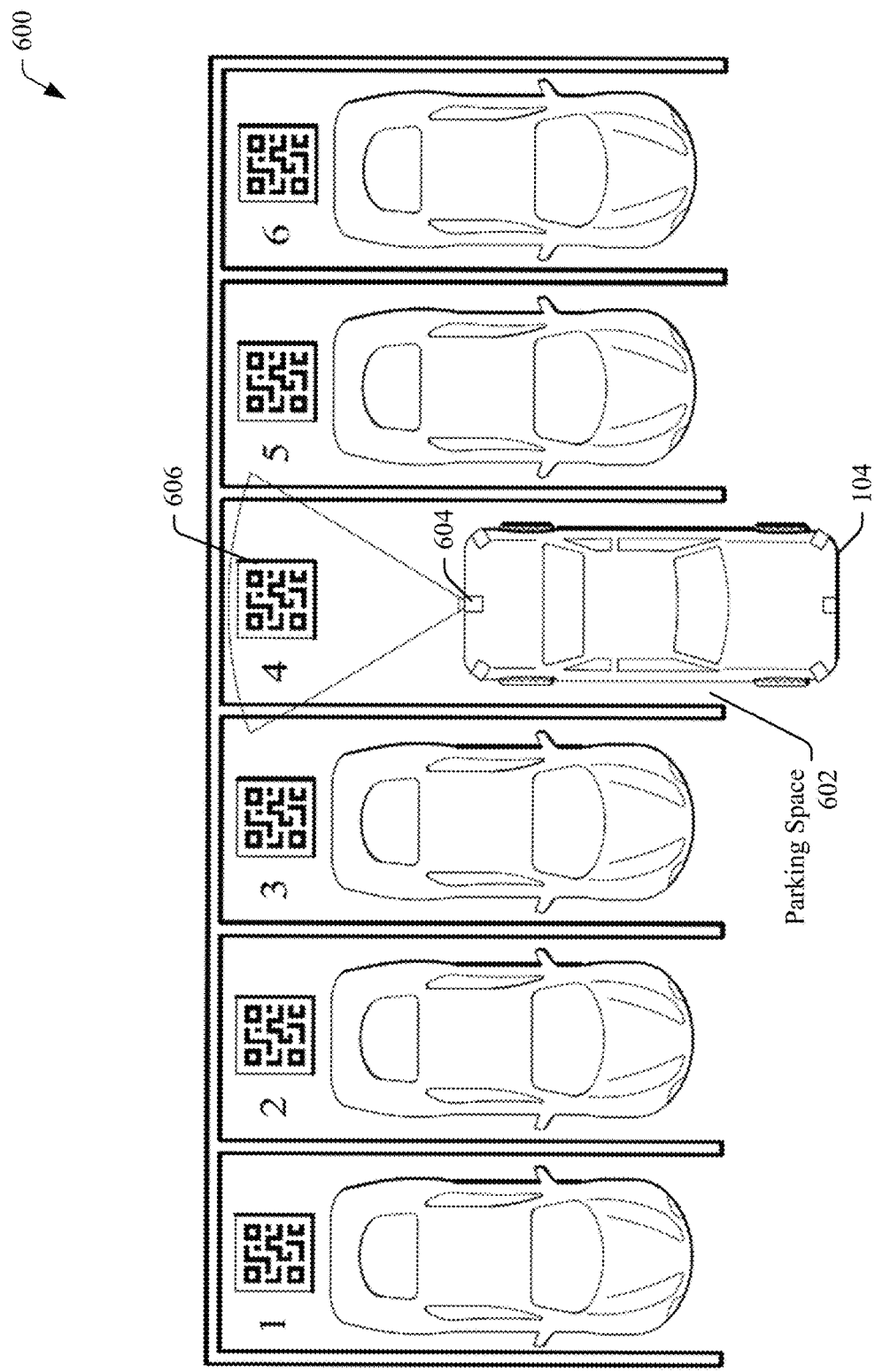
FIG. 6 is an example illustration of an environment in which a host vehicle can perform vehicle localization at a parking space in a GNSS denial environment.

FIG. 6 is an example illustration of an environment 600 in which the host vehicle 104 can perform vehicle localization at a parking space 602 in a GNSS denial environment. The system 102 of the host vehicle 104 is performing an automated valet parking operation and backing into the parking space 602. As the host vehicle 104 is being parked, the system 102 can use a rear camera 604 to take a picture of a QR code 606 or other feature associated with the parking space 602. The system 102 can use the image or video from the rear camera 604 to verify that the host vehicle 104 is navigating to the correct parking space.

The system 102 can also obtain the location of the parking space 602 in the world coordinate system via the QR code 606, which is located in or near the parking space 602. In other implementations, the system 102 can use wireless communication (e.g., V2X communication) with infrastructure in the parking garage or a map database to determine the location of the parking space 602 in the world coordinate system. The system 102 can then use image data from the rear camera 604 to determine the pose of the host vehicle 104 relative to the parking space 602, which can be used to determine an updated pose of the host vehicle 104 in the world coordinate system. When the driver summons the host vehicle 104, the system 102 can use the updated pose to autonomously navigate to a pick-up area in the GNSS denial environment.

Figure 7:
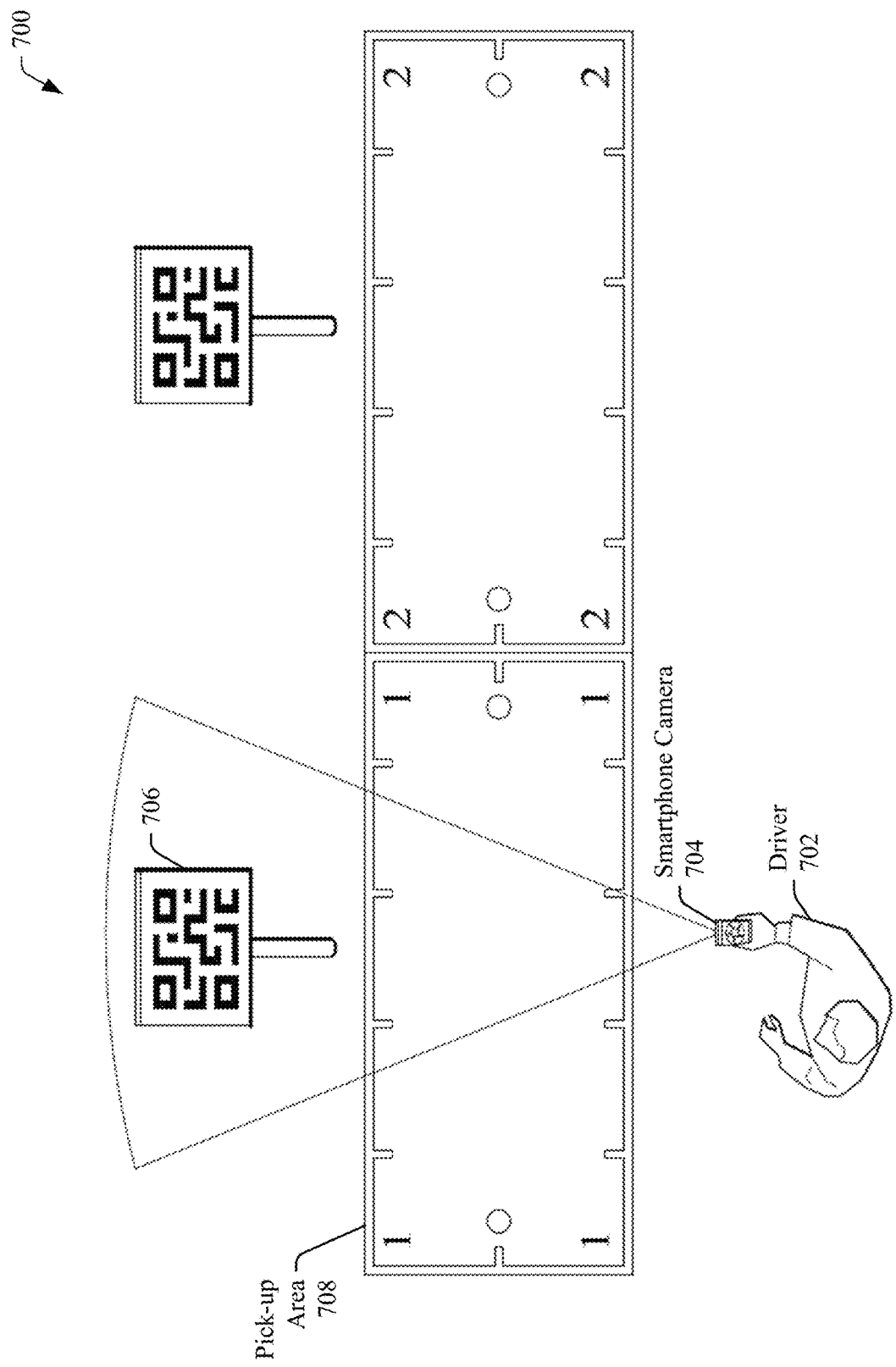
FIG. 7 is an example illustration of an environment in which a driver can summon a host vehicle as part of automated valet parking in a GNSS denial environment.

FIG. 7 is an example illustration of an environment 700 in which a driver 702 can summon a host vehicle (e.g., the host vehicle 104) as part of automated valet parking in a GNSS denial environment (e.g., a parking garage). The driver 702 can use their smartphone camera 704 to summon the host vehicle 104 by scanning or taking a picture of a QR code 706, which is associated with a particular pick-up area 708. In response to scanning the QR code 706, a summon request is communicated to the host vehicle 104. The host vehicle 104 then autonomously drives from its parking space (e.g., the parking space 602) to the pick-up area 708. Prior to autonomously driving to the pick-up area 708, the system 102 can use an infrastructure camera or other means to localize itself within the GNSS denial environment.

Example Method

Figure 8:
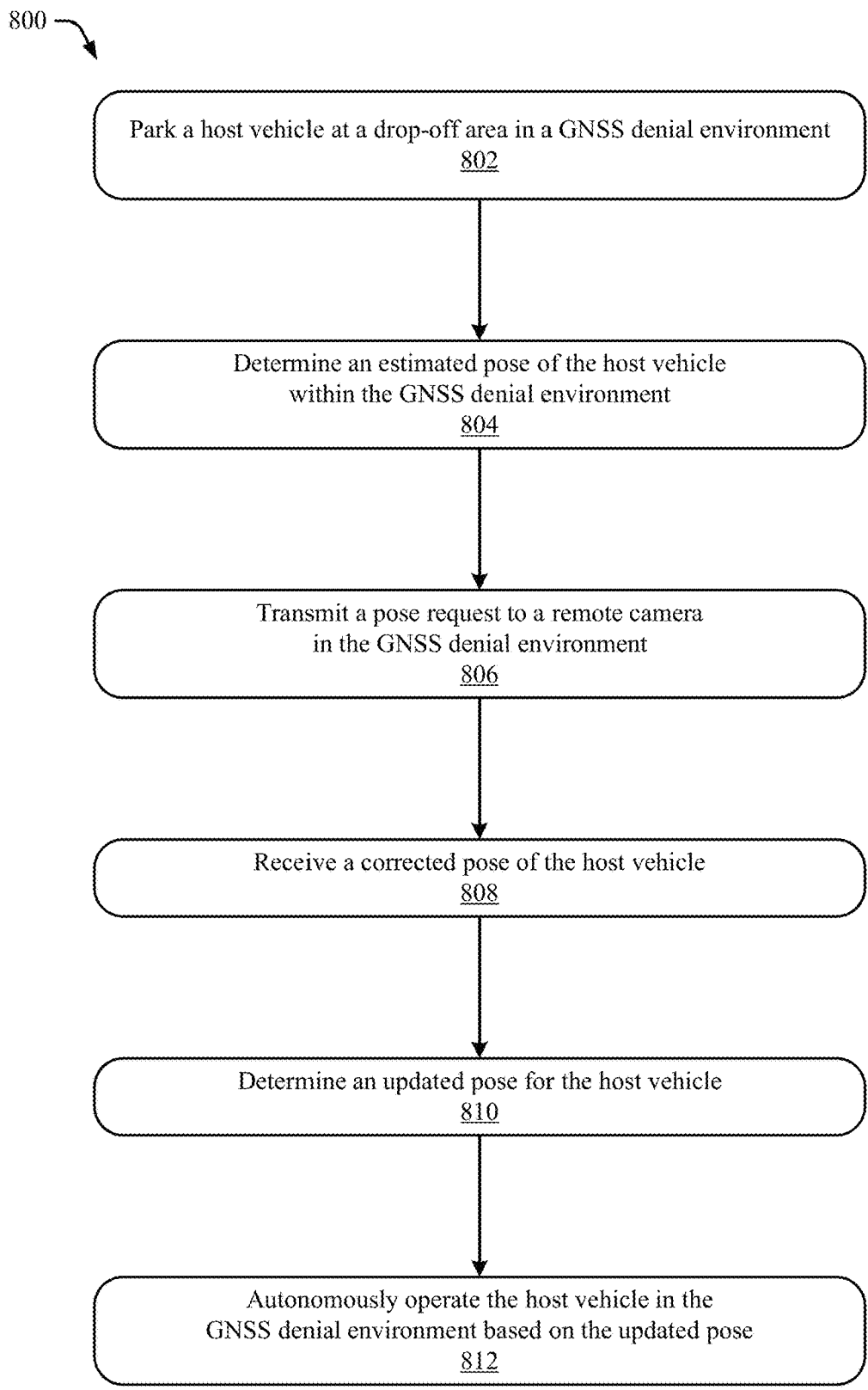
FIG. 8 illustrates an example method for vehicle localization based on pose corrections from remote cameras in a parking garage or other GNSS denial environment.

FIG. 8 illustrates an example method 800 for vehicle localization based on pose corrections from remote cameras in a parking garage or other GNSS denial environment. Method 800 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 7, reference to which is made for example only. The techniques are not limited to performance by one entity or multiple entities. For example, the system can be the system 102 of FIGS. 1 and 2.

At 802, a host vehicle is parked at a drop-off area in a GNSS denial environment. For example, the host vehicle 104 can be manually or autonomously parked at the drop-off area 202 in a GNSS denial environment (e.g., the environment 100 of FIG. 1). The GNSS denial environment can be a parking structure and the drop-off area can be a designated parking area therein for automated valet parking.

At 804, a host vehicle determines an estimated pose of the host vehicle within a GNSS denial environment. For example, the system 102 or the localization module 312-1 can determine an internal pose 402 of the host vehicle 104 in a GNSS denial environment (e.g., a parking structure or garage). The internal pose 402 can be in a map or world coordinate system.

The localization module 312-1 can determine the internal pose 402 of the host vehicle 104 within the GNSS denial environment by obtaining, in the map or world coordinate system, an initial pose of the host vehicle 104 upon entry into the GNSS denial environment. The localization module 312-1 can then determine a heading and a distance traveled by the host vehicle 104 after entering the GNSS denial environment. The heading and distance traveled can be determined using inertial measurement units, cameras, radar systems, or other sensors. The localization module 312-1 can combine the initial pose and the distance and heading traveled to estimate the internal pose 402.

At 806, a pose request is transmitted to a remote camera in the GNSS denial environment. For example, the system 102 or the localization module 312-1 can transmit the pose request 404 to the remote system 304. The remote system 304 can be integrated in or communicatively coupled to the smartphone camera 206 or the infrastructure camera 214, which is installed in the GNSS denial environment with a field of view that includes the drop-off area 202. The internal pose 402 can also be sent to the remote system 304. The system 102 or the localization module 312-1 can transmit the pose request 404 and/or the internal pose 402 using a wireless link utilizing Wi-Fi, Dedicated Short-Range Communication, Vehicle-to-Everything (V2X) communication, Bluetooth, or cellular communication.

At 808, a corrected pose of the host vehicle is received. For example, the system 102 or the localization module 312-1 can receive the corrected pose 410 from the remote system 304 or the localization module 312-2. If the system 102 sends the internal pose 402 to the remote system 304, the corrected pose 410 may provide correction values to the internal pose 402 from which the system 102 can determine the corrected pose 410. The corrected pose 410 can be determined by processing an image of the host vehicle parked within the drop-off area 202, which can include comparing a relative position of one or more portions of the host vehicle (e.g., a bumper, a tire) to one or more features of the drop-off area (e.g., a hashmark 212-1 or an alignment dot 212-2).

The system 102 or the remote system 304 can also determine, using the image obtained by the remote camera, an initial condition of the host vehicle 104 when the host vehicle 104 is parked in the drop-off area 202 (e.g., the absence of dents or scratches). Similarly, the system 102 or the remote system 304 can also compare a return condition of the host vehicle 104 to the initial condition when the host vehicle 104 is parked in the pick-up area 708.

At 810, an updated pose for the host vehicle is determined using the corrected pose. For example, the system 102 or the localization module 312-1 can determine the updated pose 412 using the corrected pose 410 received from the remote system 304. The updated pose 412 can be in a world or map coordinate system.

At 812, the host vehicle is autonomously operated based on the updated pose. For example, the system 102 or the localization module 312-1 can provide the updated pose 412 to the control system 414. The control system 414 can use the updated pose 412 to autonomously operate the host vehicle 104 in the GNSS denial environment. The system 102 can build or refine a reference map for the GNSS denial environment using a smartphone camera as the host vehicle 104 is manually operated in the GNSS denial environment, as described in greater detail with respect to FIG. 5.

For example, the control system 414 can perform an automated valet parking function that includes autonomously operating the host vehicle 104 from the drop-off area 202 to the parking space 602 in the GNSS denial environment, receiving a summons request for the host vehicle 104 to navigate to the pick-up area 708 in the GNSS denial environment, and autonomously operating the host vehicle 104 from the parking space 602 to the pick-up area 708. As the control system 414 autonomously operates the host vehicle 104 in the GNSS denial environment, the system 102 can receive additional corrected poses from one or more infrastructure cameras 214 located in the GNSS denial environment. For example, prior to autonomously operating the host vehicle 104 from the parking space 602 to the pick-up area 708, the system 102 can also receive a corrected pose for the host vehicle 104 and determine an updated pose for the host vehicle 104 to localize the host vehicle 104 prior to proceeding to the pick-up area 708.

Examples

Example 1. A method comprising: determining, by a host vehicle that is parked in a drop-off area in a GNSS denial environment, an estimated pose of the host vehicle within the GNSS denial environment; receiving, from a remote camera, a corrected pose of the host vehicle; determining, by the host vehicle and using the corrected pose, an updated pose for the host vehicle; and autonomously operating the host vehicle in the GNSS denial environment based on the updated pose.

Example 2. The method of example 1, wherein the method further comprises: transmitting a pose request to the remote camera in the GNSS denial environment to provide the corrected pose of the host vehicle within the GNSS denial environment.

Example 3. The method of example 2, wherein the pose request is transmitted using a wireless link that uses at least one of Dedicated Short-Range Communication, Vehicle-to-Everything (V2X), Bluetooth, or cellular communication.

Example 4. The method of any one of the preceding examples, wherein the remote camera comprises a smartphone camera.

Example 5. The method of any one of the preceding examples, wherein the remote camera comprises an infrastructure camera installed in the GNSS denial environment with a field of view that includes the drop-off area.

Example 6. The method of any one of the preceding examples, wherein the estimated pose and the updated pose relative to a map coordinate system.

Example 7. The method of any one of the preceding examples, wherein determining the estimated pose of the host vehicle within the GNSS denial environment comprises: obtaining, in a map coordinate system, an initial pose of the host vehicle upon entry into the GNSS denial environment; and determining a heading and a distance traveled by the host vehicle after entering the GNSS denial environment.

Example 8. The method of any one of the preceding examples, wherein the corrected pose of the host vehicle is determined by processing an image of the host vehicle parked within the drop-off area, the processing including comparing a relative position of one or more portions of the host vehicle to one or more features of the drop-off area.

Example 9. The method of any one of the preceding examples, wherein: autonomously operating the host vehicle in the GNSS denial environment comprises an automated valet parking function; and the automated valet parking function comprises: autonomously operating the host vehicle from the drop-off area to a parking space in the GNSS denial environment; receiving a summons request for the host vehicle to navigate to a pick-up area in the GNSS denial environment; and autonomously operating the host vehicle from the parking space to the pick-up area.

Example 10. The method of example 9, wherein the method further comprises: determining, using the remote camera, an initial condition of the host vehicle when the host vehicle is parked in the drop-off area; and comparing, using the remote camera, a return condition of the host vehicle to the initial condition when the host vehicle is parked in the pick-up area.

Example 11. The method of example 9 or 10, wherein the method further comprises: prior to autonomously operating the host vehicle from the parking space to the pick-up area, receiving an additional corrected pose for the host vehicle; and determining, by the host vehicle and using the additional corrected pose, an additional updated pose for the host vehicle, wherein the additional updated pose is used to autonomously operate the host vehicle to the pick-up area.

Example 12. The method of any one of examples 9 through 11, wherein the method further comprises: receiving, from one or more infrastructure cameras in the GNSS denial environment, one or more additional corrected poses for the host vehicle as the host vehicle is autonomously operated from the drop-off area to the parking space or from the parking space to the pick-up area.

Example 13. The method of any one of the preceding examples, wherein the method further comprises: prior to parking the host vehicle at the drop-off area in the GNSS denial environment, building or refining a reference map of the GNSS denial environment using a smartphone camera as the host vehicle is manually operated in the GNSS denial environment.

Example 14. The method of any one of the preceding examples, wherein: the GNSS denial environment is a parking structure; and the drop-off area is a designated parking area in the GNSS denial environment.

Example 15. A system comprising one or more processors configured to perform the method of any one of the preceding examples.

Example 16. A non-transitory computer-readable medium that stores computer-executable instructions that, when executed by a processor, cause the processor to perform the method of any one of examples 1 through 14.

CONCLUSION

Although implementations of vehicle localization based on pose corrections from remote cameras in parking garages and other GNSS denial environments have been described in language specific to certain features and/or methods, the subject of the appended claims is not necessarily limited to the specific features or methods described. Rather, the specific features and methods are disclosed as example implementations for vehicle localization based on pose corrections from remote cameras in parking garages. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method comprising:
   determining, by one or more processors and one or more sensors in a host vehicle that is parked in a drop-off area in a GNSS denial environment, an estimated pose of the host vehicle within the GNSS denial environment;
   receiving, by the one or more processors and from a remote camera, a corrected pose of the host vehicle including at least one image of the host vehicle parked within the drop-off area;
   determining, by the one or more processors and using the corrected pose of the host vehicle including at least one image of the host vehicle parked within the drop-off area, an updated pose for the host vehicle by comparing a relative position of one or more portions of the host vehicle to one or more features of the drop-off area;
   generating, by the one or more processors, an occupancy grid of the GNSS denial environment; and
   autonomously operating, by the one or more processors, the host vehicle in the GNSS denial environment based on the updated pose and the occupancy grid.

2. The method of claim 1, wherein the method further comprises:
   transmitting, by the host vehicle, a pose request to the remote camera in the GNSS denial environment to provide the corrected pose of the host vehicle within the GNSS denial environment.

3. The method of claim 2, wherein the pose request is transmitted using a wireless link that uses at least one of Dedicated Short-Range Communication, Vehicle-to-Everything (V2X), Bluetooth, or cellular communication.

4. The method of claim 1, wherein the remote camera comprises a smartphone camera.

5. The method of claim 1, wherein the remote camera comprises an infrastructure camera installed in the GNSS denial environment with a field of view that includes the drop-off area.

6. The method of claim 1, wherein the estimated pose and the updated pose are relative to a map coordinate system.

7. The method of claim 1, wherein determining the estimated pose of the host vehicle within the GNSS denial environment comprises:
obtaining, by the host vehicle and in a map coordinate system, an initial pose of the host vehicle upon entry into the GNSS denial environment; and
determining, by the host vehicle, a heading and a distance traveled by the host vehicle after entering the GNSS denial environment.

8. The method of claim 1, wherein:
autonomously operating, by the host vehicle, the host vehicle in the GNSS denial environment comprises an automated valet parking function; and
the automated valet parking function comprises:
autonomously operating the host vehicle from the drop-off area to a parking space in the GNSS denial environment;
receiving a summons request for the host vehicle to navigate to a pick-up area in the GNSS denial environment; and
autonomously operating the host vehicle from the parking space to the pick-up area.

9. The method of claim 8, wherein the method further comprises:
determining, by the host vehicle and using the remote camera, an initial condition of the host vehicle when the host vehicle is parked in the drop-off area; and
comparing, by the host vehicle and using the remote camera, a return condition of the host vehicle to the initial condition when the host vehicle is parked in the pick-up area.

10. The method of claim 8, wherein the method further comprises:
prior to autonomously operating, by the host vehicle, the host vehicle from the parking space to the pick-up area, receiving, by the host vehicle, an additional corrected pose for the host vehicle; and
determining, by the host vehicle and using the additional corrected pose, an additional updated pose for the host vehicle, wherein the additional updated pose is used to autonomously operate the host vehicle to the pick-up area.

11. The method of claim 8, wherein the method further comprises:
receiving, by the host vehicle and from one or more infrastructure cameras in the GNSS denial environment, one or more additional corrected poses for the host vehicle as the host vehicle is autonomously operated from the drop-off area to the parking space or from the parking space to the pick-up area.

12. The method of claim 1, wherein the method further comprises:
prior to parking the host vehicle at the drop-off area in the GNSS denial environment, building or refining a reference map of the GNSS denial environment using a smartphone camera as the host vehicle is manually operated in the GNSS denial environment.

13. The method of claim 1, wherein:
the GNSS denial environment is a parking structure; and
the drop-off area is a designated parking area in the GNSS denial environment.

14. A system comprising:
one or more processors and one or more sensors within a host vehicle configured to:
determine, with the one or more processors and the one or more sensors, an estimated pose of the host vehicle that is parked in a drop-off area within a GNSS denial environment;
receive, with the one or more processors and from a remote camera, a corrected pose of the host vehicle including at least one image of the host vehicle parked within the drop-off area;
determine, with the one or more processors and using the corrected pose of the host vehicle including at least one image of the host vehicle parked within the drop-off area, an updated pose for the host vehicle by comparing a relative position of one or more portions of the host vehicle to one or more features of the drop-off area;
generate, with the one or more processors, an occupancy grid of the GNSS denial environment; and
autonomously operate, with the one or more processors, the host vehicle in the GNSS denial environment based on the updated pose and the occupancy grid.

15. The system of claim 14, wherein the one or more processors are further configured to transmit a pose request to the remote camera in the GNSS denial environment to provide the corrected pose of the host vehicle within the GNSS denial environment.

16. The system of claim 14, wherein the one or more processors are further configured to determine, using the remote camera, an initial condition of the host vehicle when the host vehicle is parked in the drop-off area.

17. The system of claim 14, wherein:
the GNSS denial environment is a parking structure; and
the drop-off area is a designated parking area in the GNSS denial environment.

18. A non-transitory computer-readable medium that stores computer-executable instructions that, when executed by a processor in a host vehicle, cause the processor to:
determine an estimated pose of a host vehicle parked in a drop-off area within a GNSS denial environment;
receive, from a remote camera, a corrected pose of the host vehicle including at least one image of the host vehicle parked within the drop-off area;
determine, using the corrected pose of the host vehicle including at least one image of the host vehicle parked within the drop-off area, an updated pose for the host vehicle by comparing a relative position of one or more portions of the host vehicle to one or more features of the drop-off area;
generate an occupancy grid of the GNSS denial environment; and
autonomously operate the host vehicle in the GNSS denial environment based on the updated pose and the occupancy grid.

* * * * *